Nov. 3, 1970     F. AIZPIRI EZPELETA     3,537,335
SYSTEM FOR AUTOMATIC AND SEMIAUTOMATIC GEAR CHANGE FOR VEHICLES
Filed Sept. 10, 1968     10 Sheets-Sheet 1
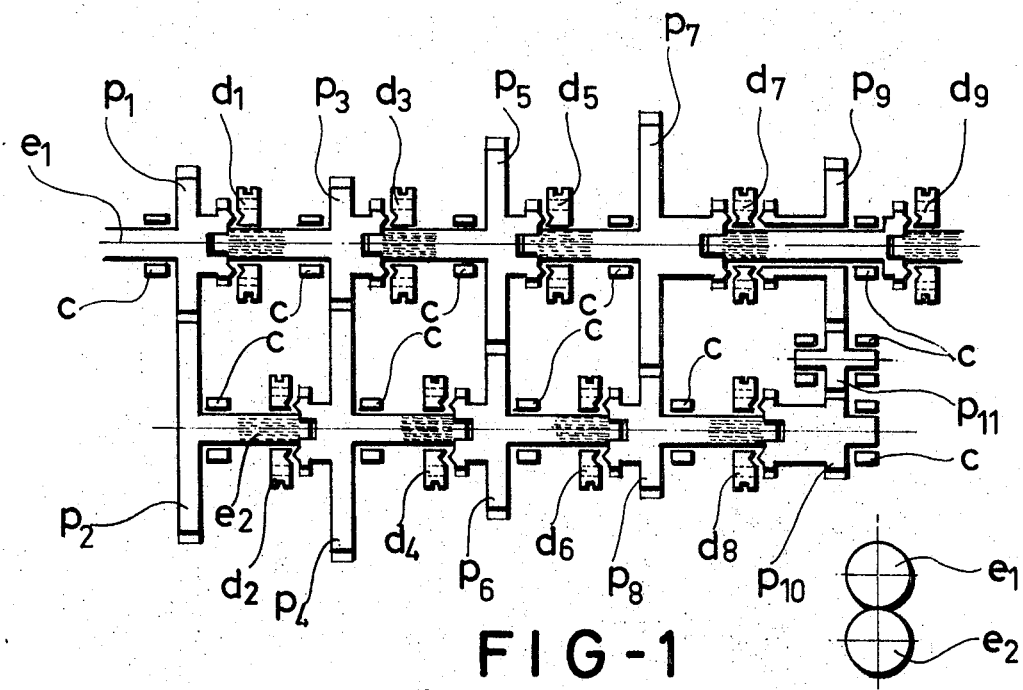
FIG-1
FIG-1A
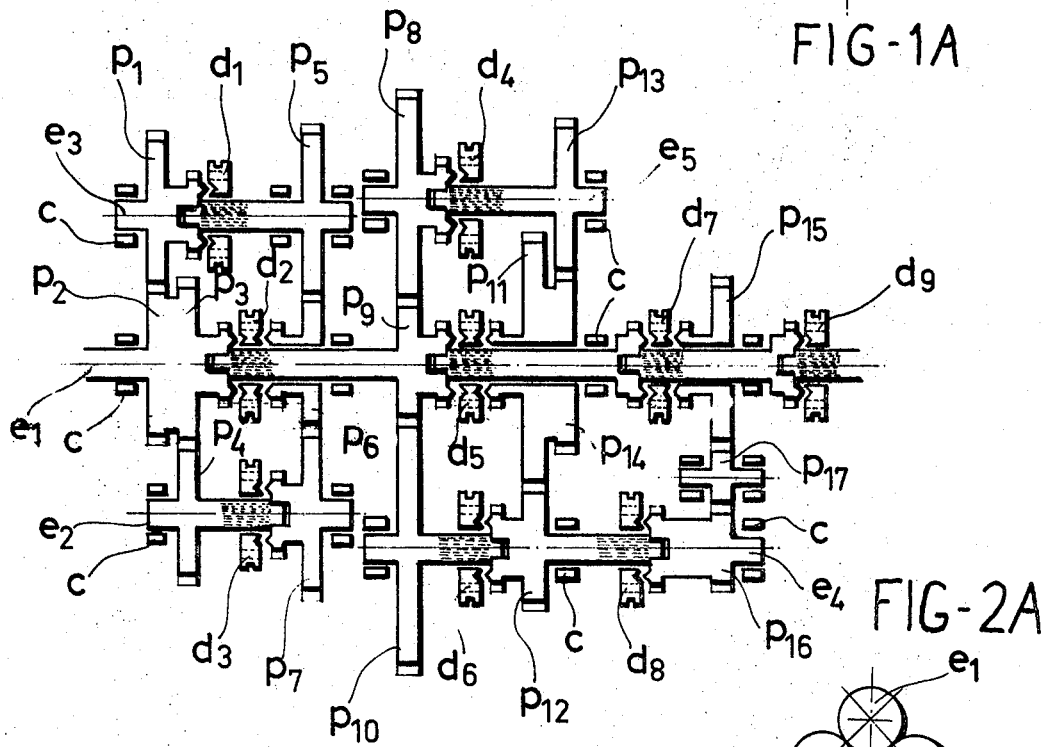
FIG-2
FIG-2A

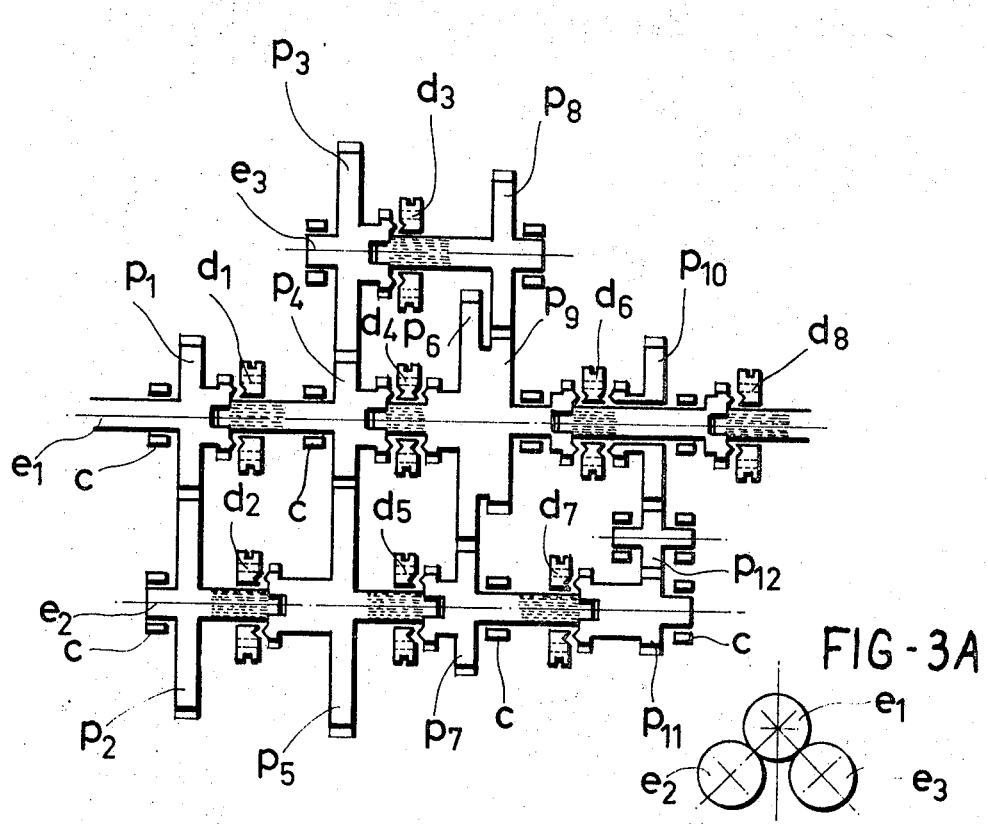
FIG-3
FIG-3A
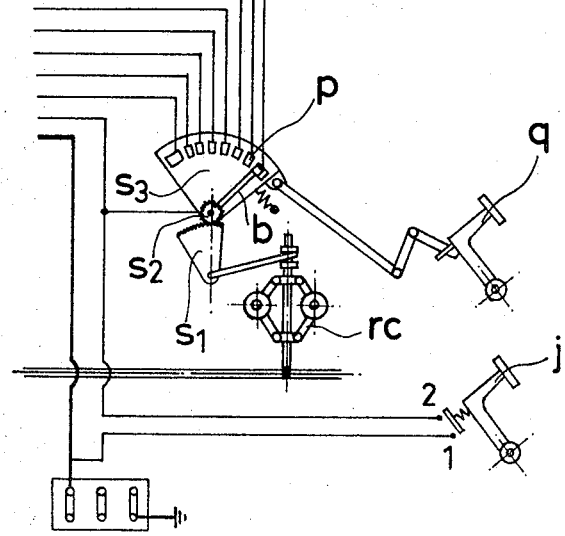
FIG-5

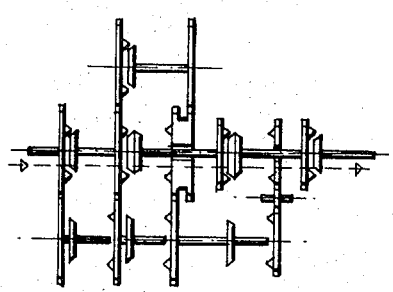
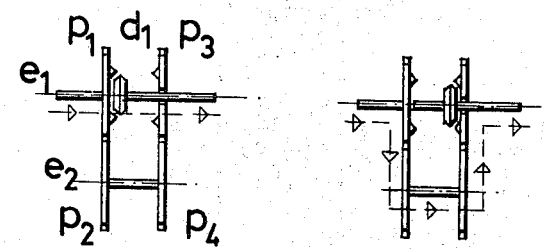
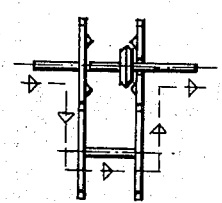
FIG-30  FIG-34  FIG-35
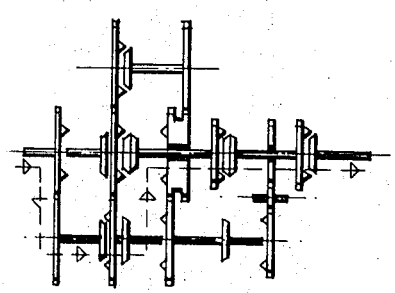
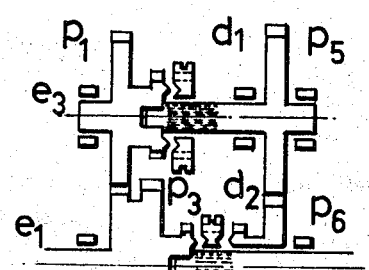
FIG-31
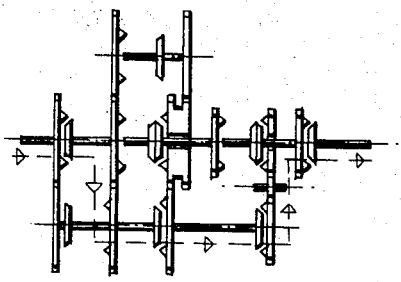
FIG-32
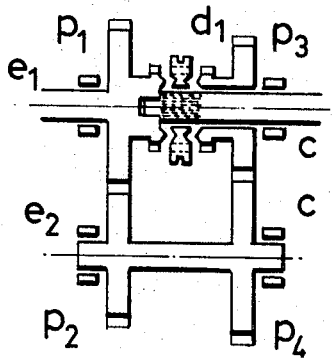
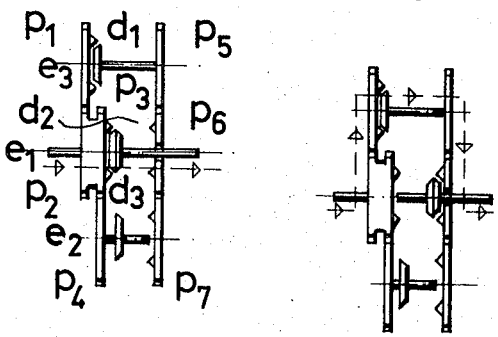
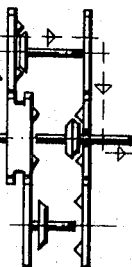
FIG-33  FIG-37  FIG-38
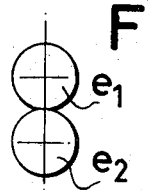
FIG-33A

United States Patent Office 3,537,335
Patented Nov. 3, 1970

3,537,335
SYSTEM FOR AUTOMATIC AND SEMIAUTOMATIC
GEAR CHANGE FOR VEHICLES
Fernando Ezpeleta Aizpiri, Olite 41,
Pamplona, Navarre, Spain
Filed Sept. 10, 1968, Ser. No. 758,884
Claims priority, application Spain, Sept. 12, 1967,
344,980
Int. Cl. B60k 17/10; F16h 5/46, 3/22
U.S. Cl. 74—867                                6 Claims

ABSTRACT OF THE DISCLOSURE

A system for vehicle automatic gear change basically comprising several gears mounted on two or more shafts —one of them being an extension to the transmission outlet—some of them fixed onto the shafts, others loose and others displaceable with single or double synchronization cones. Interlocking takes place by means of a radial force governor situated at the gear change outlet and controlling the speed of the vehicle by means of different electrical contacts coming into action in accordance with the speed, with the required electrical current sent through relays for maneuvering some sliding valves which open and shut the oil pressure flow producing the movement of the synchronized gears and thus obtaining the different gear changes required for the different vehicle speeds.

---

The present invention refers to an automatic system for changing gears which includes an infinite number of solutions with regard to the speeds, over-speeds, reduced speeds, etc., apart from reverse or neutral.

In addition, the invention refers to a semiautomatic system combining the current lever gear change with the automatic system to obtain the over-speeds and, if required, the reduced speeds or also the small over-speeds, in all the gears, doubling and tripling, and if even more is required, all the normal gear change speeds.

The gear changes at the different appropriate moments are carried out automatically by only pressing down the clutch pedal, which establishes the electrical contacts necessary for taking electrical current to the different points which correspond to the various vehicle speeds. While running on one particular gear, it is impossible to change to another without first pressing down the clutch pedal.

To produce the normal speeds, over-speeds and reduced speeds, there is an electrical switch on the lever head. On changing the position of the latter while either executing the change with the lever or after the change has been executed, and on pressing down the clutch and establishing contact, the current is sent to the corresponding point for modifying the normal speeds, over-speeds, or reduced speeds in the form required. The modifications can be prepared while moving, and no change is made until the clutch pedal is pressed down.

In another embodiment of the semiautomatic system, although the function is similar to the one described in the first embodiment for the semiautomatic system, the difference lies in the fact that the electrical switching is produced by means of a centrifugal governor mounted on the transmission shaft, at the current gear change outlet, which therefore controls the engine turning speed. In the same way, no change will occur with regard to the speeds established by the lever until the clutch pedal is pressed down.

There are many advantages of the system of the present invention for automatic and semiautomatic gear change for vehicles. Only a clutch is required, and this need not be hydraulic. There is no freewheel. Only one oil pressure pump is required. All the gear changes are synchronized. It is not necessary to install devices such as a retarder, adjuster, separator, receder, etc. The manufacture of the different elements which make up this new system is simple and the mounting and repair of same is within the scope of any normal mechanic. It is impossible for the gears to overlap simultaneously; therefore, there is no possibility of a breakdown in this respect. The gear change combinations which can be obtained are innumerable, as well as apart from the normal gears, establishing the extent of the large or small over-drives and reduced speeds. In the automatic gear change system the hand lever for controlling the gears has only three positions: forward, reverse, and neutral and the changes are executed automatically on pressing down the clutch pedal. Fuel consumption is reduced on account of the disc clutch and the over-drives. This system can be used in low and high powered cars, lorries, buses, etc.

In one embodiment of the semiautomatic system, as the control is done by a centrifugal governor, no hand lever is required for gear preparation, as these are obtained beforehand with a lever of the normal gear box, the changes for normal gears, over-drives, or reduced speeds being obtained by pressing down the clutch pedal.

In another embodiment of the semiautomatic system, no hand lever is required either, for the gear changes, as these are obtained beforehand with a normal gear box lever, preparing the changes to the normal gears, over-drives or reduced speeds, on turning the head of said lever, the changes being effected on pressing down the clutch pedal.

Both in the automatic, as well as semiautomatic system, running in a certain gear, the same gear can be used with more or less acceleration—an interesting advantage for driving down bad roads—as no gear change can be obtained until the clutch pedal is pressed down. In the semiautomatic system without centrifugal governor, while running in a certain gear change and without needing to modify the speed of the vehicle nor to declutch, another combination can be prepared for a normal gear to an over-drive or reduced speed or from the latter to normal gear, as the prepared change can only be obtained by pressing down the clutch pedal.

These as well as further advantages which are apparent in the invention will become apparent from the following description, reference being had to the accompanying drawings wherein:

FIGS. 1, 2 and 3 illustrate automatic embodiments A, B and C, respectively;

FIGS. 1A, 2A and 3A illustrate a side view of the shafts of FIGS. 1, 2 and 3, respectively;

FIG. 5 illustrates an accelerator pedal connection both mechanical and electrical for the embodiments illustrated in FIGS. 1, 2 and 3;

FIGS. 26 through 32 show in diagrammatic form the different speed changes which can be obtained with embodiment C illustrated in FIG. 3;

FIG. 33 illustrates a semiautomatic embodiment D;

FIG. 33A illustrates a side view of the shaft shown in FIG. 33;

FIGS. 34 and 35 show two gear changes obtained with embodiment D illustrated in FIG. 33;

FIG. 36 illustrates semiautomatic embodiment E;

FIG. 36A illustrates a side view of the shafts of FIG. 36;

FIGS. 37 through 39 show in diagrammatic form some gear changes obtained with embodiment E illustrated in FIG. 36;

Details of the system—Due to the basic design of the system, innumerable embodiments can be formed for the automatic and semiautomatic system, with regard to the number of shafts, number of gears, sizes of the latter, number of sliding clutches or synchronization clutches, etc. We are only giving three embodiments for the automatic systems and two for the semiautomatic system, out of the very many which can be obtained, although all of them are essentially the same system.

The automatic embodiment A (FIG. 1) consists of two shafts: $e_1$ at the inlet and outlet of the transmission and the secondary $e_2$. The constant intake gears $p_1$ with $p_2$ are mounted on the said shafts; $p_5$ with $p_6$; $p_7$ with $p_8$ and $p_9$ with $p_{10}$ through $p_{11}$ in reverse, the sliding clutches or synchronization clutches with single synchronization cone $d_1$, $d_2$, $d_3$, $d_4$, $d_5$, $d_6$ and $d_9$ and the sliding clutch or synchronization clutch $d_7$ with double synchronization cones, for interlocking in accordance with their displacement with the corresponding gears. These shafts are formed with various longitudinal pieces fitted into each other, with ribbing in the sliding clutches' area and mounted on the bearings $c$, and each one can turn independently from the different parts making up the shafts.

Figure 4:
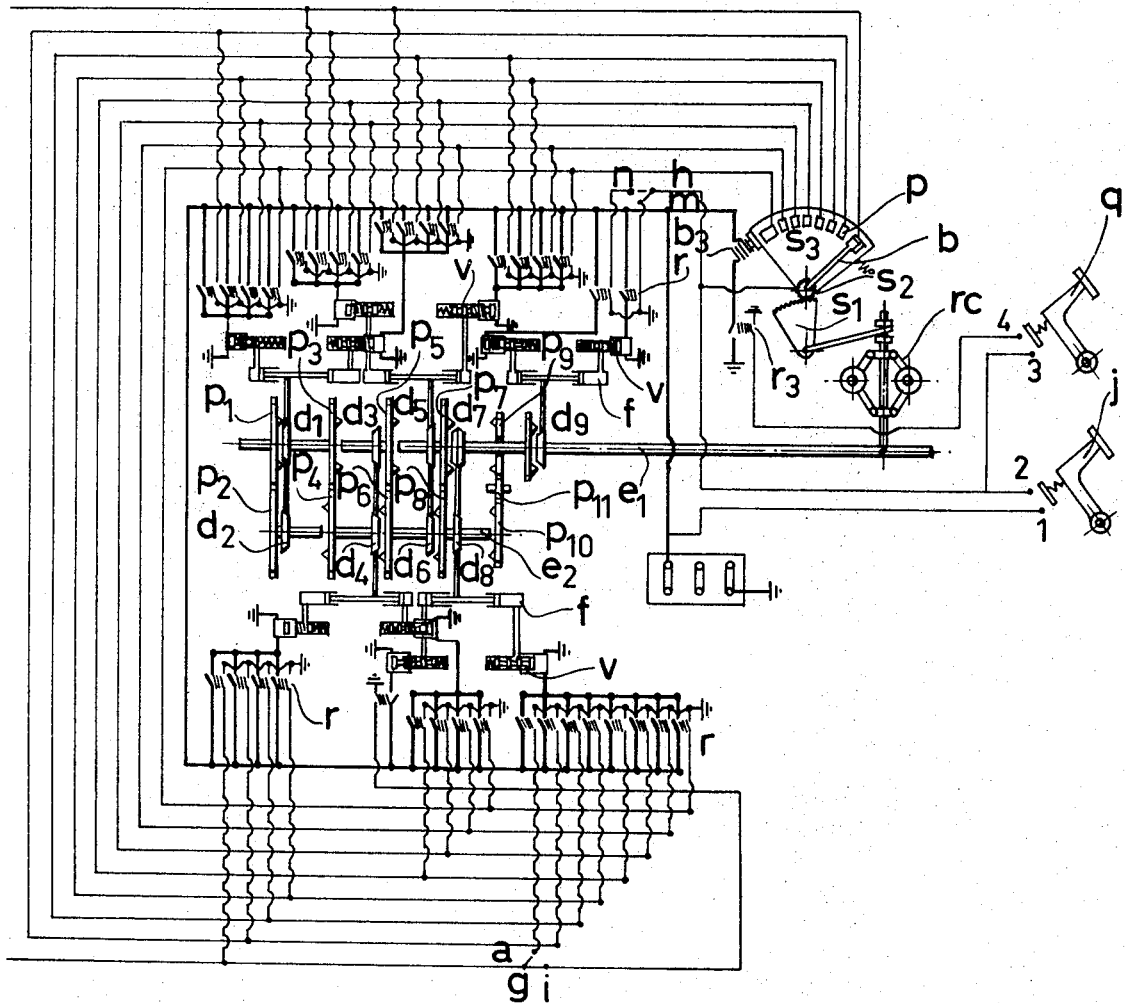
FIG. 4 illustrates an arrangement of elements which move the sliding clutches, and the electrical installation with which different circuits are established with different speeds.

According to FIG. 4, the centrifugal governor $rc$ is at the shaft outlet $e_1$ and through the notched sector $s_1$ and pinion $s_2$ moves the arm $b$ for connecting with the different points $p$ situated in the $s_3$ sector according to the vehicle's speed, by sending electrical current to the appropriate relays $r$, by closing the right circuits. The sliding valves $v$ are made to function and the pistons, which transfer the sliding clutches corresponding to each case, move. The closing of the circuits to the relays is subject to the fact that, on pressing down the clutch pedal $j$, the circuit is established through points 1 and 2; therefore, the vehicle can continue to run at any established speed, either with more or less acceleration, until the clutch pedal is pressed down.

FIG. 4 illustrates the arrangement of the different elements: shafts $e_1$ and $e_2$; constant intake pinions $p_1$ to $p_{11}$; sliding clutches $d_1$ to $d_9$ with their synchronization cones; electric relays $r$; sliding valves $v$; pistons $f$ which move the sliding clutches and the electrical installation, with which the different circuits are established, corresponding to the different speed moments; the switch $g$, which in position $a$ allows for forward running and in $i$ reversing; switch $h$ which in position $m$ allows for any speed and in $n$ for neutral. Once the vehicle is moving and as its speed increases, the arm $b$ moved by the centrifugal governor $rc$, runs on the different contact points, $p$, preparing the different gear change combinations, which can be produced at will by pressing down the clutch pedal $j$ and closing the electrical circuits through points 1 and 2 at the moment when the corresponding change preparation begins, according to the speed of the vehicle, or when the speed maximum corresponding to this change, giving a selection margin, is reached. In order to facilitate the reduction to a lower speed, a turn in the $s_3$ sector can be produced by forcing the position of the contact points $p$ toward the lower speeds by means of two embodiments: first, by closing an electrical circuit through the contacts 3 and 4, on pressing the accelerator pedal $q$, on the condition that it is also closed by 1 and 2 by means of the clutch pedal $j$. This will lead to the functioning of relay $r_3$, which brings the solenoid coil $b_3$ into action, which through attraction makes the sector $s_3$ turn with the contact points $p$ and modifies the position of the latter in respect to the contact arm $b$. The second embodiment consists of producing the turn of sector $s_3$ with the contact points $p$, mechanically, with the accelerator pedal $q$, as shown in FIG. 5.

Figure 6:
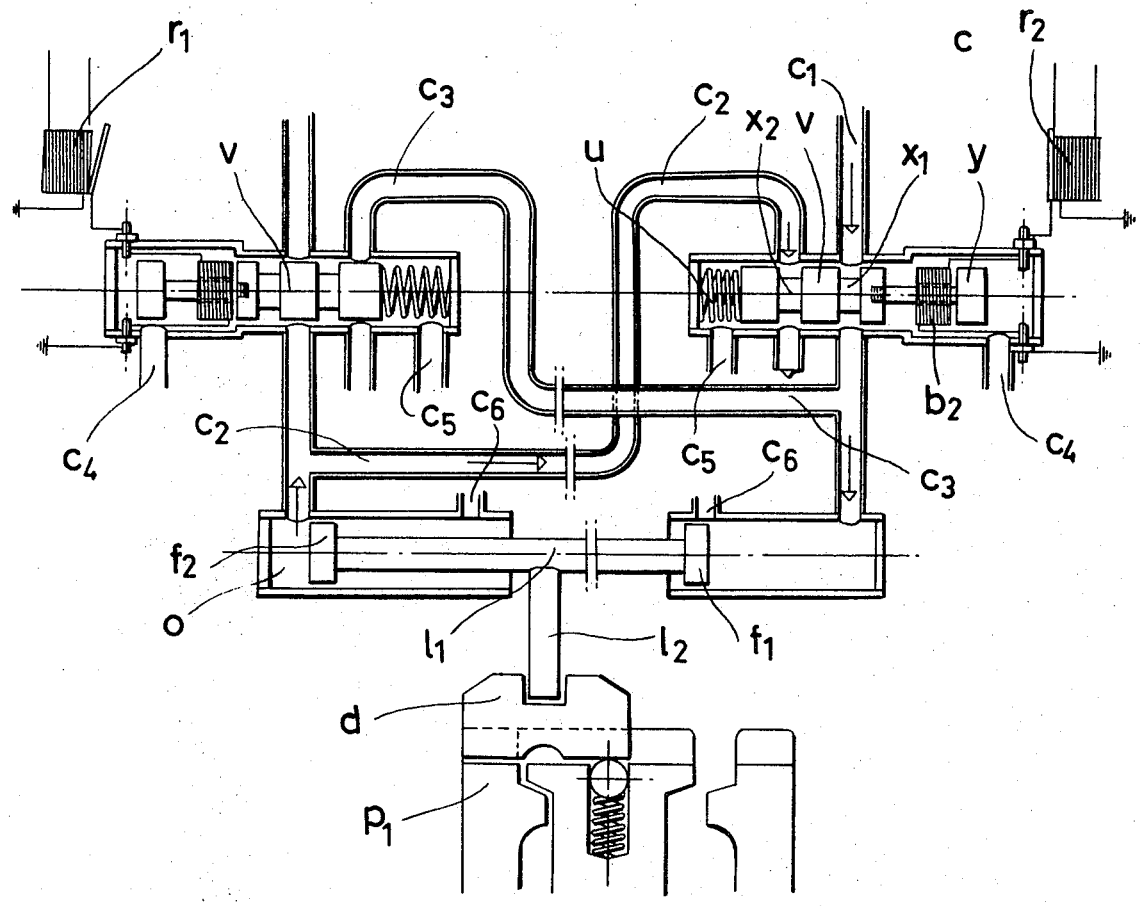
FIG. 6 illustrates an arrangement of electrical relays, sliding valves, pistons and sliding clutches applicable to all embodiments.

FIG. 6 illustrates the electrical relays, the sliding valves, the pistons and the sliding clutches. In this arrangement, relay $r_1$ is not working and $r_2$ is in action, making coil $b_2$ function, which attracts the body $y$ joined in sliding valve $v$ overcoming the pressure of spring $u$, allowing the circulation of the oil, supplied at pressure by an ordinary pump with its outlet valve, through the conduit $c_1$ and passage $x_1$ in the direction of the arrows, which drive the piston $f_1$ joined to $f_2$ by the bar $l_1$ and transmits the movement through $l_2$ to the sliding clutches' head $d$ and makes the former interlock synchronously with with the gear $p_1$ and in turn with the others. As the piston $f_2$ is displaced by $f_1$, pressure is produced in the oil holdback in the chamber and, as it has no outlet through the sliding valve $v$, it is driven through the conduit $c_2$ and returns to the pump via passage $x_2$. FIG. 6 shows that as the pressurized oil enters through conduit $c_1$, it cannot circulate through $c_3$ as the outlet is shut off by the sliding valve $v$.

To avoid pressure through retentions at the ends of the sliding valve $v$ and to facilitate its expulsion, conduits $c_4$ and $c_5$, which return the oil to the pump, have been provided.

In the same way, the overflow $c_6$ situated at the end of the run of the said pistons, according to FIG. 6, have been provided in order to avoid continuous pressure being exercised on the pistons $f_1$ and $f_2$, if the clutch pedal is pressed down for a long time.

FIGS. 7 to 15, inclusive, show in sketch form the different speed changes which can be obtained with the automatic embodiment A, which is described in FIG. 1, according to the different positions of the sliding clutches, which function jointly $d_1$ with $d_2$; $d_3$ with $d_4$; $d_5$ with $d_6$ and $d_7$ with $d_8$. $d_9$ is only concerned with neutral and speeds.

Figures 7, 12:
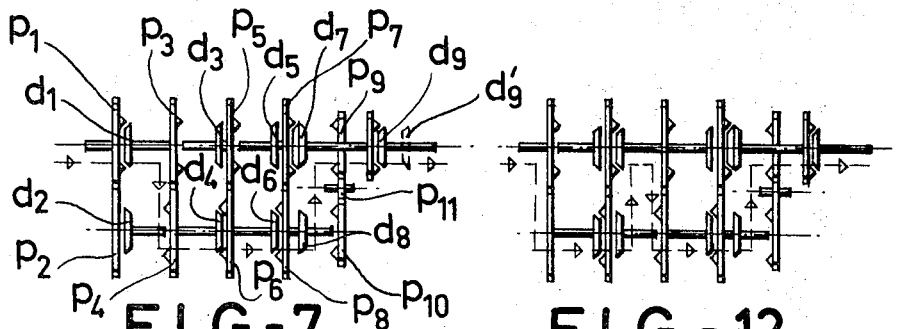
FIGS. 7 through 15 show in diagrammatic form the different speed changes which can be obtained with automatic embodiment A of FIG. 1.

FIG. 7 shows that with the sliding clutch $d_9$ in position $d'_9$, it is situated in neutral in any change. With the sliding clutch in position $d_9$, it is placed for gears.

Figures 8, 13:
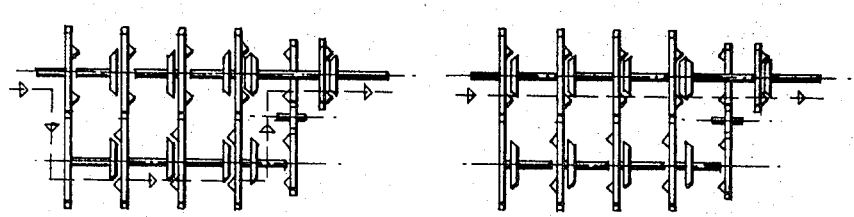
Figures 9, 14:
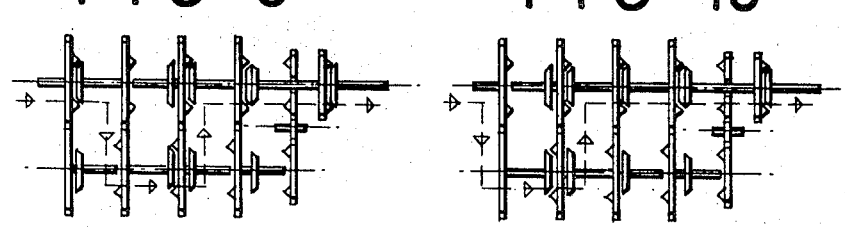
Figures 10, 15:
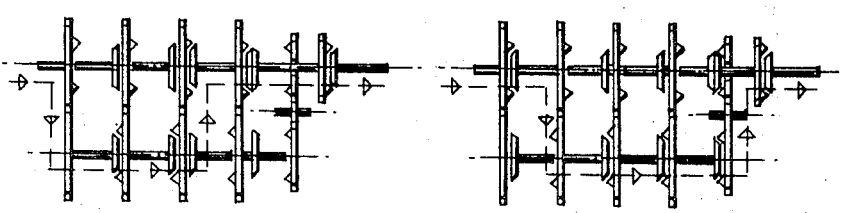
Figure 11:
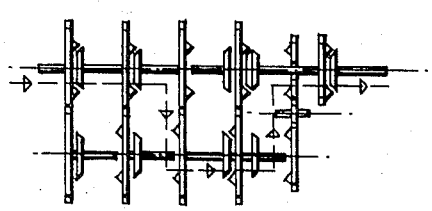

The number of teeth of the different constant intake gears can be fixed for producing the desired gear changes. For example, if there are, in FIGS. 1 and 7:

$p_1$—18 teeth     $p_7$—30 teeth
$p_2$—27 teeth     $p_8$—15 teeth
$p_3$—15 teeth     $p_9$—20 teeth
$p_4$—30 teeth     $p_{10}$—10 teeth
$p_5$—25 teeth     $p_{11}$—interim for reverse
$p_6$—20 teeth with sliding clutch arrangement according to FIGS. 7 to 15 inclusive, the following gears function, with the transmission according to the passage indicated with arrows and by establishing top gear as value 1, we get:

FIG. 7—1st gear=0.250     FIG. 12—super 5th=0.833
FIG. 8—2nd gear=0.333     FIG. 13—top gear=1.000
FIG. 9—3rd gear=0.400     FIG. 14—overdrive=1.333
FIG. 10—4th gear=0.533     FIG. 15—reverse=−0.250
FIG. 11—5th gear=0.625

Automatic embodiment B, according to FIG. 2, consists of the following shafts: $e_1$ transmission inlet and outlet and $e_2$, $e_3$, $e_4$ and $e_5$, which are secondary. The constant intake pinions $p_1$ with $p_2$; $p_3$ with $p_4$; $p_5$ with $p_6$ and with $p_7$; $p_8$ with $p_9$ and with $p_{10}$; $p_{11}$ with $p_{12}$; $p_{13}$ with $p_{14}$; and $p_{15}$ with $p_{16}$ through reverse $p_{17}$, are all mounted on the aforementioned shafts; the sliding clutches with simple synchronization cones $d_1$, $d_3$, $d_4$, $d_6$, $d_8$ and $d_9$ and the sliding clutches with double synchronization cones, $d_2$, $d_5$ and $d_7$, to interlock according to their displacements with the corresponding pinions. These shafts consist of several longitudinal pieces set into each other, with the ribbing in the sliding clutches' area, mounted on the bearings $c$, with the ability to turn independently from each of the different pieces forming the shaft.

The explanation given for FIGS. 4 and 5 in embodiment A is applicable to embodiment B, and it is therefore considered unnecessary to repeat same.

FIG. 6 is completely applicable to all the embodiments.

FIGS. 16 to 25 inclusive indicate, in sketch form, the different gear changes which can be obtained with embodiment B, which is described in FIG. 2, according to the different positions of the sliding clutches, functioning jointly $d_1$ with $d_3$; $d_4$ with $d_6$ and $d_7$ with $d_8$. $d_2$ and $d_5$ and $d_9$ for neutral and reverse intervene independently.

Figure 16:
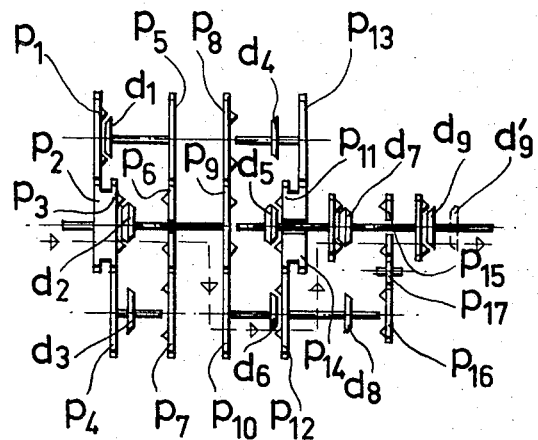
FIGS. 16 through 25 show in diagrammatic form the different gear changes which can be obtained with embodiment B illustrated in FIG. 2.

FIG. 16—With the sliding clutch $d_9$ in position $d'_9$, neutral is situated in any change. With the said clutch in position $d_9$, it is ready for all gears.

Figure 19:
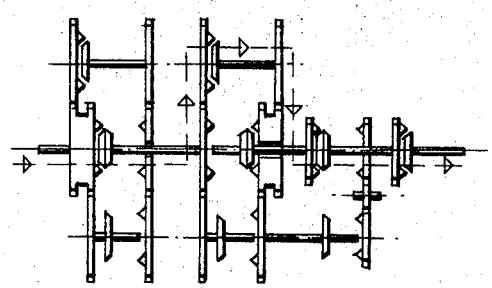
Figure 17:
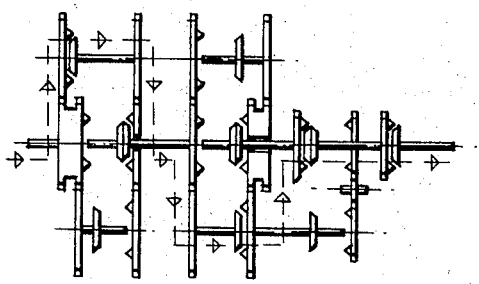
Figure 20:
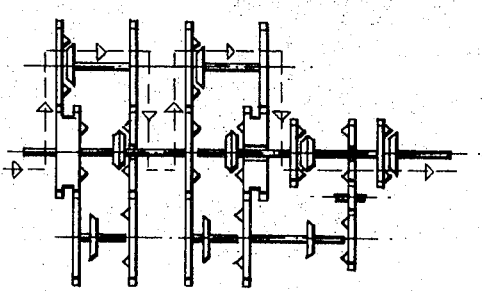
Figure 18:
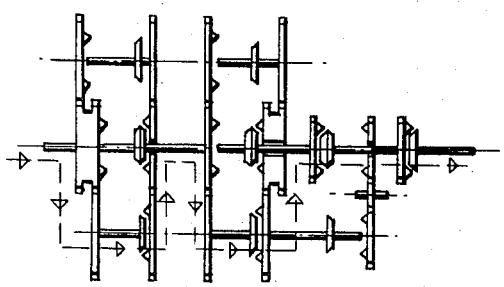
Figure 21:
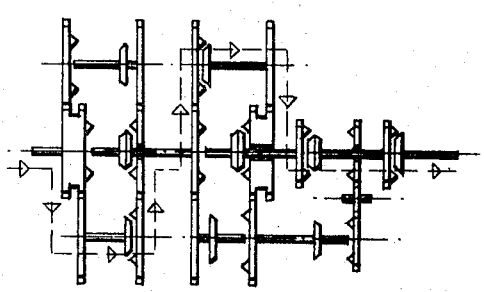
Figure 22:
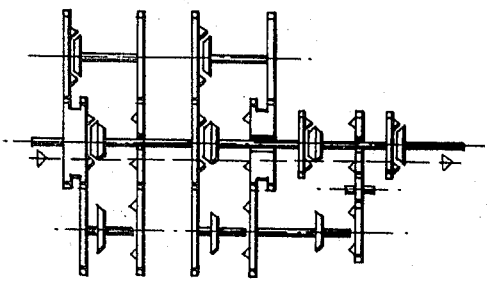
Figure 23:
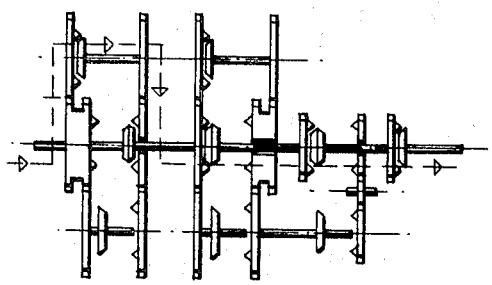
Figure 27:
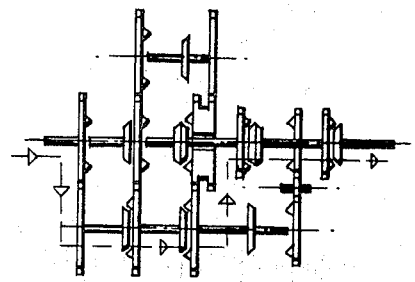
Figure 24:
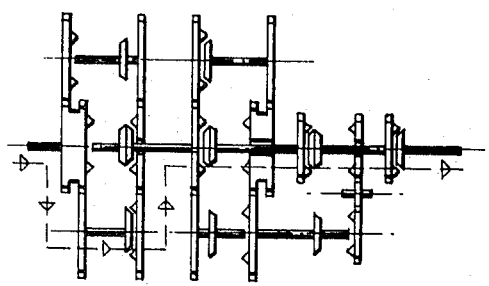
Figure 28:
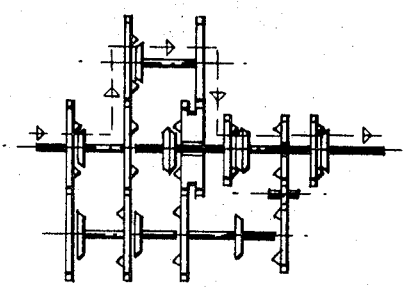
Figure 25:
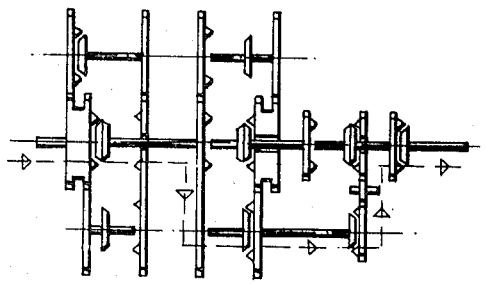
Figure 29:
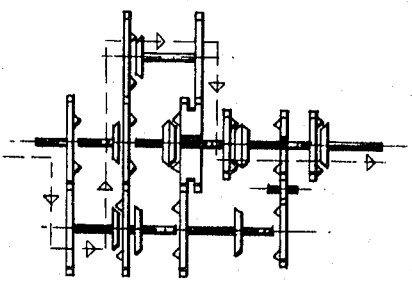

The number of teeth of the different constant intake gears can be established to produce the desired gear changes. For example, if there are in FIGS. 2 and 16:

$p_1$—19 teeth        $p_{10}$—30 teeth
$p_2$—19 teeth        $p_{11}$—30 teeth
$p_3$—20 teeth        $p_{12}$—30 teeth
$p_4$—17 teeth        $p_{13}$—19 teeth
$p_5$—21 teeth        $p_{14}$—21 teeth
$p_6$—17 teeth        $p_{15}$—20 teeth
$p_7$—20 teeth        $p_{16}$—10 teeth
$p_8$—25 teeth        $p_{17}$—intermediate for reverse
$p_9$—15 teeth with the sliding clutches arranged according to FIGS. 16 to 25 inclusive, the following gears function with the transmission according to the passage indicated with arrows, and by establishing top gear as value 1, we get:

FIG. 16—1st=0.250
FIG. 17—small super first=0.309
FIG. 18—large super 1st=0.346
FIG. 19—2nd=0.543
FIG. 20—small super 2nd=0.670
FIG. 21—large super 2nd=0.751
FIG. 22—top=1.000
FIG. 23—small overdrive=1.235
FIG. 24—large overdrive=1.384
FIG. 25—reverse=0.250

Automatic embodiment C according to FIG. 3 consists of the following shafts: $e_1$ transmission inlet and outlet and the secondary ones $e_2$ and $e_3$. The constant intake pinions $p_1$ with $p_2$; $p_3$ with $p_4$ and with $p_5$; $p_6$ with $p_7$; $p_8$ with $p_9$ and $p_{10}$ with $p_{11}$ through reverse $p_2$, are all mounted on the aforementioned shafts; the sliding clutches with simple synchronization cone $d_1$, $d_2$, $d_3$, $d_5$, $d_7$ and $d_8$ and the sliding clutches with double synchronization cones $d_4$ and $d_6$ for interlocking according to their displacements with the corresponding pinions. These shafts consist of various longitudinal pieces set into each other, with the ribbing in the sliding clutches' area mounted on bearings $c$, each of the different pieces of the shafts being able to turn independently.

The explanation given for FIGS. 4 and 5 in embodiment A is applicable for embodiment C and it is, therefore, considered unnecessary to repeat same.

FIG. 6 and the explanation of same is entirely applicable to all the embodiments.

FIGS. 26 to 32 inclusive show, in sketch form, the different speed changes which can be obtained with embodiment C, described in FIG. 3, according to the different positions of the sliding clutches, $d_1$ functioning jointly with $d_2$; $d_3$ with $d_5$ and $d_6$ with $d_7$. $d_4$ and the neutral sliding clutch $d_8$ intervene independently.

Figure 26:
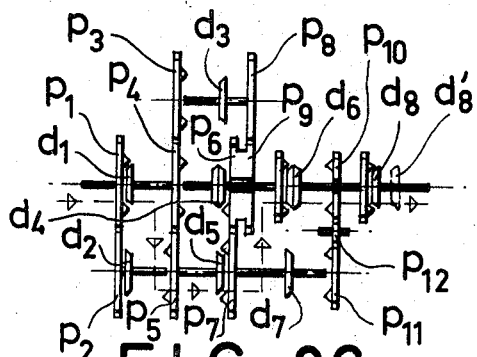

FIG. 26—Neutral position is established in any change with the sliding clutch $d'_8$ in position $d_8$. It is ready for all speeds with the said sliding clutch in position $d_8$.

The number of teeth of the constant intake gear can be established for producing the desired speed changes: For example, if they are in FIGS. 3 and 26:

$p_1$—18 teeth        $p_7$—15 teeth
$p_2$—27 teeth        $p_8$—19 teeth
$p_3$—25 teeth        $p_9$—21 teeth
$p_4$—15 teeth        $p_{10}$—20 teeth
$p_5$—30 teeth        $p_{11}$—10 teeth
$p_6$—30 teeth        $p_{12}$—interim for reverse with the sliding clutch arrangement according to FIGS. 26 to 32 inclusive, the following gears function with the transmission according to the passage indicated with arrows, and establishing direct speed as value 1, we get:

Embodiment D semiautomatic, according to FIG. 33, consists of two shafts: $e_1$ prolongation of the normal gear box and inlet and outlet of semiautomatic change, and $e_2$ which is secondary. The constant intake pinions $p_1$ with $p_2$ and $p_3$ with $p_4$, and the sliding clutch with double synchronization cones, for interlocking according to their displacements with the corresponding pinions, are all mounted on these shafts. Shaft $e_1$ consists of two longitudinal pieces, set in each other, with the ribbing corresponding to the sliding clutches, mounted on the bearings $c$, the two shaft pieces being able to turn independently, from the shaft $e_1$.

Figure 40:
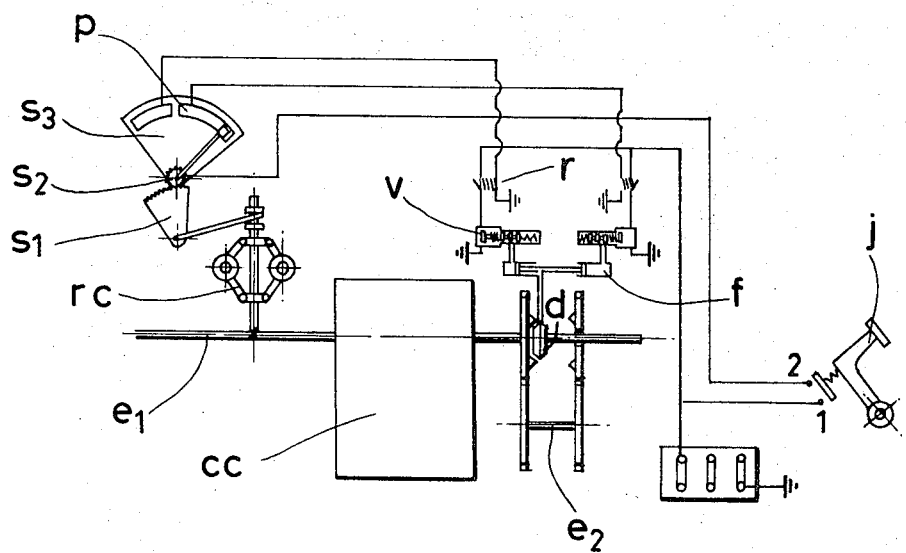
FIG. 40 shows connections to the clutch pedal and gear box with the inclusion of a governor.

FIG. 40 shows that at the entrance to the shaft $e_1$ in the normal gear box $cc$, there is a centrifugal governor $rc$ which controls the speed of the engine revolutions and moves the arm $b$, through the notched sector $s_1$ and pinion $s_2$, to connect with the contact points $p$ according to the engine revolution speed, by sending electric current to the corresponding relays $r$, in order to close off the appropriate circuits. The sliding valves $v$ are made to function and the pistons $f$, which transfer the sliding clutch $d$ in the direction corresponding to each particular case, move. The closing of the circuit to the relays is subject to the fact that as the clutch pedal is pressed down, the circuit is established through the contacts 1 and 2; therefore the vehicle can continue in any established gear, although more or less acceleration may be used, while the clutch pedal is not pressed down.

FIG. 6 and its explanation is entirely applicable to all the embodiments.

FIGS. 34 and 35 show, in sketch form, the two gear changes which can be obtained in addition to the gears obtained with the normal gear box, with embodiment D semiautomatic, described in FIG. 33, according to the two positions of the sliding clutch $d_1$.

The number of teeth of the different constant intake gears can be established for producing the desired gear changes. For example, if there are in FIG. 33:

$p_1$ 18 teeth        $p_3$—15 teeth
$p_2$—27 teeth        $p_4$—30 teeth with the sliding clutch arranged according to FIGS. 34 and 35, the following gear changes function with the transmission according to the run indicated with arrows, and by establishing top gear as value 1, we get:

FIG. 34—top=1.000
FIG. 35—over drive=1.333

Semiautomatic embodiment E, according to FIG. 36, consists of three shafts: $e_1$ prolongation of the normal gear box transmission and semiautomatic inlet and outlet change, and the secondary shafts $e_2$ and $e_3$.

These shafts support the constant intake pinions etc., the sliding clutches with simple synchronization cone $d_1$ and $d_3$, and the sliding clutch with double synchronization cones, for interlocking according to their displacements with the corresponding gears. Each of these shafts consists of two longitudinal pieces set into each other, with the ribbing in the sliding clutches' area mounted on bearings c, each of the different shaft pieces being able to turn independently.

Figure 41:
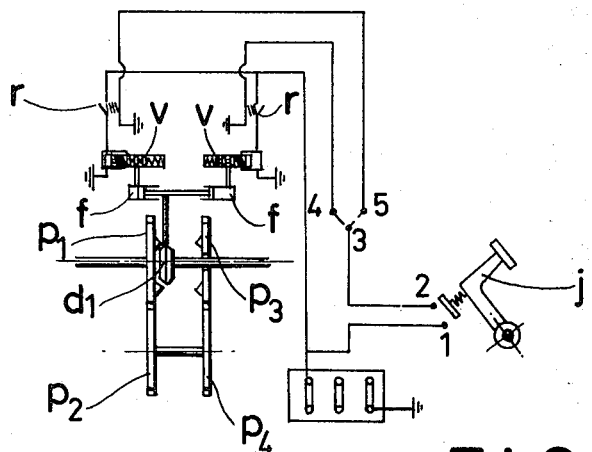
FIG. 41 illustrates electrical circuits controlling valves and pistons.

FIG. 41 illustrates the electrical circuits which close the appropriate circuits and make the sliding values $v$ function and move the pistons $f$, which in turn transfer the sliding clutch pinions in the direction corresponding to each case, through contacts 1 and 2 when the clutch pedal $j$ is pressed down and through the switch, which establishes the circuit on the common contact 3 with 4 or 5, sending electric current to the corresponding relays $r$. The closing of the circuits to the relays $r$ is subject to the fact that on pressing down the clutch pedal, this closing is established via the contacts 1 and 2. Therefore, the vehicle can continue in any established gear, even though there may be more or less acceleration, until the clutch pedal is pressed down.

Figure 42A:
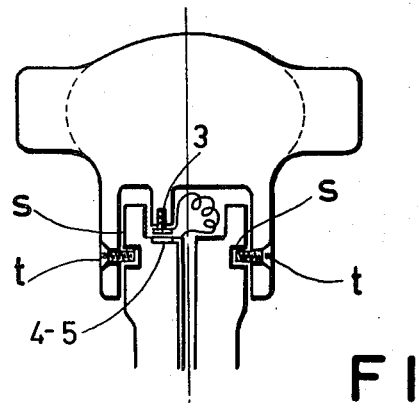
FIGS. 42A and 42B illustrate a vertical section and an uncovered plan view respectively, of embodiments of the switch in the head of a normal change lever.
Figure 42B:
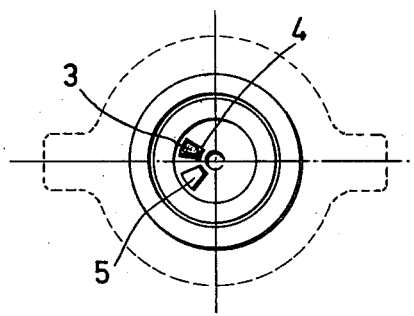

There are many embodiments which can be given to the switch in the head of the normal change lever. One of them is described in FIG. 42A—vertical section—and in FIG. 42B—uncovered plan—in which the latter has a revolving movement limited by the slots $s$ and screws $t$, during which contacts 3 with 4 or 3 with 5 are established, at will, to obtain the normal gears or overdrive.

FIG. 6 and its explanation is entirely applicable to all the embodiments.

Figure 39:
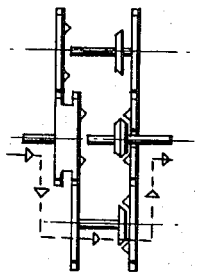

FIGS. 37, 38 and 39 illustrate, in sketch form, the three gear changes which can be obtained in addition to the gears obtained in the normal gear box with embodiment E described in FIG. 36, according to the positions of the sliding clutches $d_1$ functioning jointly with $d_3$ and $d_2$ independently.

The number of teeth of the constant intake gears can be established for producing the desired gear changes. For example, if there are in FIGS. 36 and 37:

$p_1$—19 teeth          $p_5$—21 teeth
$p_2$—19 teeth          $p_6$—17 teeth
$p_3$—20 teeth          $p_7$—20 teeth
$p_4$—17 teeth with the sliding clutches arranged according to FIGS. 37, 38 and 39, the following gears function with the transmission according to the run indicated with arrows and by establishing top gear as value 1, we get:

FIG. 37—top=1.000
FIG. 38—small over drive=1.235
FIG. 39—large over drive=1.384

Having described the basis, details, working and advantages of the invention, we would state that the number, distribution and dimensions of the constant intake gears and of the sliding clutches, as well as the number and distribution of the shafts; the application of different types of devices to those described herein, such as the centrifugal governor or switches, which do not affect the essential part of this invention; or any voluntary variations or changes due to manufacturing requirements which are considered convenient, are all included in the invention for this new perfected system for automatic and semiautomatic gear change for vehicles. We would also point out that although general mention has been made to the fact that there are innumerable possible embodiments, only three automatic and two semiautomatic embodiments have been described on an explanatory and informative basis.

Having put forward the aforementioned description, the execution details of the invention disclosed herein can vary, without changing the basis of the invention.

What is claimed is:
1. A system for automatic and semiautomatic gear changes for vehicles comprising:
   a transmission,
   at least two shafts, each made up of various longitudinal pieces set in each other, which can jointly and independently turn,
   one of said shafts connected into said transmission as a promulgation of the outlet of said transmission,
   another of said shafts aligned in a parallel axis with said one shaft,
   gears rigidly coupled to said shafts, loose gears, and moveable gears on said shafts,
   sliding clutches with interlocking single and double synchronization cones also mounted on said shafts,
   piston means connected to said sliding clutches for movement of said clutches,
   valve means interconnected to said piston means for movement of said piston means,
   change means to control the system according to the speed of the vehicle connected to said valve means for movement of said valve means between opening and closing position,
   and clutch pedal means to initiate action of said change means connected to said change means.

2. The system for automatic and semiautomatic gear changes for vehicles of claim 1, further characterized by:
   said change means including:
      electrical-magnetic means connected to said valve means for control of sliding movement of said valve means,
      electrical contact means connected to said electrical-magnetic means to supply current to selected elements of said electrical-magnetic means in accordance with the speed of the vehicle.

3. The system for automatic and semiautomatic gear changes for vehicles of claim 2, further characterized by:
   solenoid means to move said electrical contact means connected to said electrical contact means,
   an accelerator pedal connected to close the circuit of said solenoid means to effect a lowering of the vehicle speed.

4. The system for automatic and semiautomatic gear changes for vehicles of claim 1, further characterized by:
   said change means including:
      a multiposition means connected to said valve means to move selected valves of said valve means in accordance with the speed of the vehicle.

5. The system for automatic and semiautomatic gear changes for vehicles of claim 4, further characterized by:
   said change means including:
      an accelerator pedal mechanically connected to said multiposition means to effect a lowering of the vehicle speed.

6. The system for automatic and semiautomatic gear changes for vehicles of claim 4, further characterized by:
   centrifugal governor means to control the speed of the engine revolutions of the vehicle connected to said multiposition means for movement of said multiposition means in accordance with movement of said centrifugal governor means.

References Cited

UNITED STATES PATENTS

| Re. 21,844 | 6/1941 | Vetter | 74—867 X |
| 2,694,940 | 11/1954 | Schmitter | 74—331 X |
| 3,064,488 | 11/1962 | Lee et al. | 74—331 X |
| 3,318,167 | 5/1967 | Frost | 74—331 |

FOREIGN PATENTS

| 1,032,657 | 7/1953 | France. |

LEONARD H. GERIN, Primary Examiner

U.S. Cl. X.R.

74—331, 336.5, 346